Figure 1:
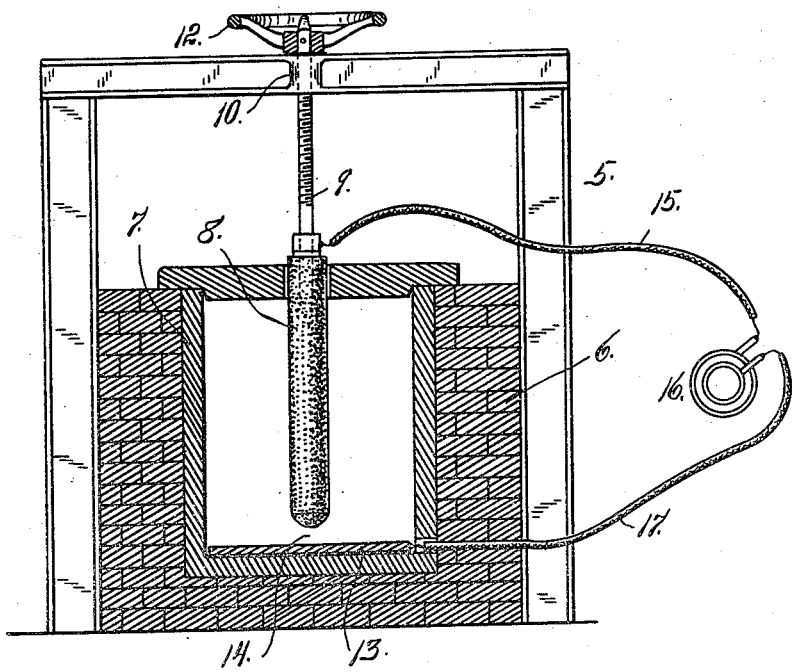

A. KISSOCK.
PROCESS OF EXTRACTING ALUMINUM FROM ITS ORES.
APPLICATION FILED JUNE 6, 1911.

1,052,727.

Patented Feb. 11, 1913.

Witnesses
Otto E. Hoddick.
A. E. Adams.

Inventor
Alan Kissock.
By A. J. O'Brien
Attorney

UNITED STATES PATENT OFFICE.

ALAN KISSOCK, OF GOLDEN, COLORADO.

PROCESS OF EXTRACTING ALUMINUM FROM ITS ORES.

1,052,727.  Specification of Letters Patent.  Patented Feb. 11, 1913.

Application filed June 6, 1911. Serial No. 631,614.

*To all whom it may concern:*

Be it known that I, ALAN KISSOCK, a citizen of the United States, residing at Golden, county of Jefferson, and State of Colorado, have invented certain new and useful Processes of Extracting Aluminum from its Ores; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a process of extracting aluminum from its ores, and consists in forming a charge consisting of an intimate mixture of any suitable aluminum bearing material, sufficient carbon to convert the contained aluminum into aluminum carbid, and the required amount of some suitable compound of sulfur to change the aluminum carbid into aluminum sulfid; or, a charge consisting of an intimate mixture of any aluminum bearing material, sufficient carbon to convert the contained aluminum into aluminum carbid, the aluminum sulfid to be formed later by heating the aluminum carbid with the required amount of sulfur or some compound of sulfur to change the aluminum carbid to aluminum sulfid. Either of these charges is put into an electric furnace of suitable design to furnish the required heat for the operation. The aluminum compound thus formed is separated from the resulting mass, dissolved, and electrolyzed in a molten bath of alkaline earth chlorids or fluorids and the resulting aluminum drawn off.

In order that others skilled in the art may be able to practise the invention, I will now describe the same more specifically, specifying a particular aluminum compound as well as other specific ingredients, together with proper proportions for obtaining good results. It must be understood, however, that the invention is in no way limited to these particular proportions, or to the identical ingredients or elements employed. The charge may consist of an intimate mixture of aluminum silicate and carbon in the form of coke, according to and in the given proportions required by the following equation:

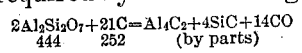
$$2Al_2Si_2O_7 + 21C = Al_4C_2 + 4SiC + 14CO$$
$$\text{444} \quad \text{252} \quad \text{(by parts)}$$

This charge is put in an electric furnace of suitable design and heated to a high temperature of, say 3500° centigrade, more or less as may be required. The aluminum carbid thus formed is separated from the resulting mass and heated with sulfur according to and in the proportions required by the following equation:

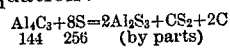
$$Al_4C_3 + 8S = 2Al_2S_3 + CS_2 + 2C$$
$$\text{144} \quad \text{256} \quad \text{(by parts)}$$

The resulting aluminum sulfid is then dissolved and electrolyzed in a molten bath of alkaline earth chlorid or fluorid and the resulting aluminum drawn off; or, the charge may consist of an intimate mixture of aluminum silicate, carbon in the form of coke, and calcium sulfid, according to and in the proportions required by the following equation:

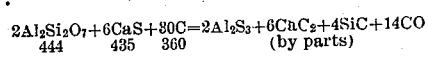
$$2Al_2Si_2O_7 + 6CaS + 30C = 2Al_2S_3 + 6CaC_2 + 4SiC + 14CO$$
$$\text{444} \quad \text{435} \quad \text{360} \quad \text{(by parts)}$$

This charge is put in an electric furnace of suitable design and heated to 3500° centigrade, more or less, as may be required to reduce it to a viscous condition. The aluminum sulfid thus formed is separated from the resulting mass, dissolved and electrolyzed in a molten bath of alkaline earth chlorids or fluorids and the resulting aluminum drawn off, as before.

Figure 2:
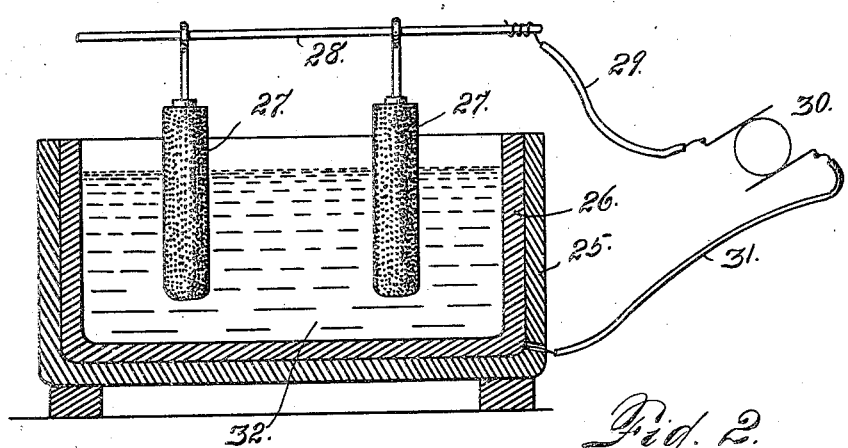

In the accompanying drawing forming a part of this application, Figure 1 is a sectional view of an electric furnace suitable for practising my process, while Fig. 2 illustrates a molten bath suitable therefor.

Referring to Fig. 1, let the numeral 5 designate a frame-work located outside of the walls of the furnace. These walls are composed of brick 6 provided with a lining 7 of some material sufficiently refractory to stand a high degree of heat. An electrode 8 is adjustably mounted in the furnace by means of a screw-shaft 9 threaded in the upper part of the frame-work as shown at 10, the upper extremity of the screw-shaft extending above the frame-work and being provided with a hand-wheel 12 for manual operation. Opposite the lower extremity of the electrode 8 and located in the bottom of the furnace, is a second electrode 13, the two electrodes 8 and 13 being separated sufficiently, as shown at 14, to produce an arc when the electric current is turned on. The electrode 8 is connected by means of a conductor 15 with one pole of a generator 16, from the opposite pole of which a conductor 17 leads to the electrode 13.

Referring to Fig. 2, the numeral 25 designates a suitable receptacle provided with a lining 26 located in an electrical circuit with electrodes 27 which are mounted on a bar 28 composed of an electrical conductor. From this bar 28 a wire 29 leads to one pole of a generator 30, from the opposite pole of which a wire 31 leads to the lining 26 which may be termed another electrode. The electric circuit between the parts 26 and 27 is completed through the liquid 32, which constitutes the molten bath heretofore explained.

Having thus described my invention, what I claim is:

1. The herein described process of extracting aluminum from its ores, consisting in forming an intimate mixture of any suitable aluminum bearing material, sufficient carbon to convert the contained aluminum into aluminum carbid, and the required amount of some suitable compound of sulfur to change the aluminum carbid into aluminum sulfid, and heating the same to a viscous condition, and extracting aluminum, substantially as described.

2. The herein described process of extracting aluminum from its ores, consisting in forming a charge containing an intimate mixture of any suitable aluminum bearing material, sufficient carbon to convert the contained aluminum into aluminum carbid, the aluminum sulfid being formed later by heating the aluminum carbid with the required amount of sulfur or some compound of sulfur to change the aluminum carbid into aluminum sulfid, the said charge being subjected to the necessary heat to reduce it to a viscous mass, and extracting aluminum, substantially as described.

3. A process of extracting aluminum from its ores, consisting in forming an intimate mixture of any suitable aluminum bearing material, sufficient carbon to convert the contained aluminum into aluminum carbid, and the required amount of some suitable compound of sulfur to change the aluminum carbid into aluminum sulfid, heating the charge to reduce it to a viscous mass, and recovering the aluminum therefrom by dissolving and electrolyzing the aluminum sulfid in a molten bath, substantially as described.

4. The herein described process of extracting aluminum from its ores, consisting in forming an intimate mixture of any suitable aluminum bearing material, sufficient carbon to convert the contained aluminum into aluminum carbid, and the required amount of some suitable compound of sulfur to change the aluminum carbid into aluminum sulfid, heating the charge to form a viscous mass, and separating the aluminum therefrom by dissolving and electrolyzing the aluminum sulfid in a molten bath of alkaline earth solvents.

5. The herein described process of extracting aluminum from its ores, consisting in forming an intimate mixture of any suitable aluminum bearing material, sufficient carbon to convert the contained aluminum into aluminum carbid, and the required amount of some suitable compound of sulfur to change the aluminum carbid into aluminum sulfid, heating the charge to a viscous condition, and recovering the aluminum from the aluminum sulfid.

In testimony whereof I affix my signature in presence of two witnesses.

ALAN KISSOCK.

Witnesses:
F. E. BOWEN,
CLARA E. BRODEN.